(12) United States Patent
Gruss et al.

(10) Patent No.: US 10,738,848 B2
(45) Date of Patent: Aug. 11, 2020

(54) BRAKE SYSTEM

(71) Applicant: COMMISSARIAT A L'ENERGIE ATOMIQUE ET AUX ENERGIES ALTERNATIVES, Paris (FR)

(72) Inventors: Jean-Antoine Gruss, Seyssinet (FR); Frederic Ducros, Fontanil (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 126 days.

(21) Appl. No.: 15/572,021

(22) PCT Filed: May 4, 2016

(86) PCT No.: PCT/EP2016/060108
§ 371 (c)(1),
(2) Date: Apr. 9, 2018

(87) PCT Pub. No.: WO2016/177844
PCT Pub. Date: Nov. 10, 2016

(65) Prior Publication Data
US 2018/0216684 A1 Aug. 2, 2018

(30) Foreign Application Priority Data
May 6, 2015 (FR) .................................... 15 54083

(51) Int. Cl.
*F16D 65/847* (2006.01)
*B60T 5/00* (2006.01)
(Continued)

(52) U.S. Cl.
CPC .............. *F16D 65/847* (2013.01); *B60T 5/00* (2013.01); *B64C 25/42* (2013.01); *B64C 25/44* (2013.01);
(Continued)

(58) Field of Classification Search
CPC ................. F16D 65/128; F16D 65/847; F16D 2065/785; F16D 2065/788; F16D 2065/789; B60T 5/00
See application file for complete search history.

(56) References Cited

U.S. PATENT DOCUMENTS 2,552,571 A    5/1951  Mercier
3,889,786 A *  6/1975  Schrader ................. F16D 65/10
                                              188/218 R
(Continued)

FOREIGN PATENT DOCUMENTS

EP    0555822 A1    8/1993
EP    2503176 A1    9/2012
FR    2990188 A1    11/2013

OTHER PUBLICATIONS

International Search Report dated Aug. 5, 2016, in PCT/EP2016/060108, filed May 4, 2016.

*Primary Examiner* — Thomas W Irvin
(74) *Attorney, Agent, or Firm* — Oblon, McClelland, Maier & Neustadt, L.L.P.

(57) ABSTRACT

According to an aspect, this invention relates to a cooling device for a disc brake, the device extending in a longitudinal direction and comprising a first portion configured to surround the discs of the brake, intended for being arranged facing the side surfaces of the brake discs and configured to capture, by irradiation and/or convection, the heat generated by the discs during the friction. The cooling device further includes a second portion, secured and thermally coupled to the first portion, offset in the longitudinal direction relative to the first portion, and provided with tins extending radially relative to the longitudinal direction and configured to dissipate the heat captured by the first portion, by convection and/or irradiation, into the ambient air.

37 Claims, 6 Drawing Sheets

(51) Int. Cl.
  *B64C 25/44* (2006.01)
  *B64C 25/42* (2006.01)
  *F16D 65/12* (2006.01)
  *F16D 65/78* (2006.01)
(52) U.S. Cl.
  CPC ...... *F16D 65/128* (2013.01); *F16D 2065/789* (2013.01)

(56) References Cited

U.S. PATENT DOCUMENTS

| | | | | |
|---|---|---|---|---|
| 3,958,833 A * | 5/1976 | Stanton | .................... | F16D 55/40 |
| | | | | 301/6.2 |
| 4,017,123 A * | 4/1977 | Horner | .................... | B60C 23/18 |
| | | | | 301/6.91 |
| 4,130,187 A | 12/1978 | Midolo | | |
| 4,944,370 A * | 7/1990 | Chambers | ............... | F16D 55/36 |
| | | | | 188/264 G |
| 5,002,342 A | 3/1991 | Dyko | | |
| 5,024,297 A * | 6/1991 | Russell | .................... | F16D 55/36 |
| | | | | 188/18 A |
| 5,199,536 A | 4/1993 | Clark | | |
| 5,248,013 A * | 9/1993 | Hogue | .................... | F16D 55/36 |
| | | | | 188/264 G |
| 5,538,114 A * | 7/1996 | White | .................... | F16D 65/10 |
| | | | | 188/218 R |
| 7,051,845 B2 * | 5/2006 | Thorp | .................... | F16D 55/36 |
| | | | | 188/71.6 |
| 8,157,062 B2 * | 4/2012 | Enright | .................... | F16D 55/36 |
| | | | | 188/71.5 |
| 9,718,317 B2 * | 8/2017 | Kendricks | ........... | B60B 27/0047 |
| 9,718,447 B2 * | 8/2017 | Waltz | .......................... | B60T 5/00 |
| 9,908,375 B2 * | 3/2018 | Baden | .................... | B64C 25/36 |
| 10,077,818 B2 * | 9/2018 | Whittle | ................... | F16D 65/128 |
| 10,203,010 B2 * | 2/2019 | Gonzalez | ................... | B64C 25/42 |
| 10,330,163 B2 * | 6/2019 | French | ................... | F16D 65/847 |
| 2005/0224634 A1 | 10/2005 | Rea | | |
| 2010/0194179 A1 * | 8/2010 | Waltz | ......................... | B60T 5/00 |
| | | | | 301/6.91 |
| 2012/0241557 A1 | 9/2012 | Coty | | |
| 2013/0015023 A1 * | 1/2013 | Hassett | ................ | F16D 65/847 |
| | | | | 188/71.6 |
| 2018/0023647 A1 * | 1/2018 | Remond | ................ | B64C 25/42 |

\* cited by examiner

Figure 6 ns and the field of
BRAKE SYSTEM

TECHNICAL FIELD OF THE INVENTION

This invention relates to the field of brake systems and more particularly a brake cooling system. A particularly advantageous but non-limiting application is the field of brakes for wheels or axles for example of aircraft.

PRIOR ART

The cooling of brakes in the field of air transport is an important factor in the time allocated to each flight procedure. On aircraft, the cooling time of brakes is a major parameter of the safety protocols. Indeed, it is necessary for the temperature of the brakes to be less than a certain value before the aircraft is authorised to carry out a take-off procedure for example.

Most of the current braking systems use carbon-carbon discs. Brake discs can reach temperatures of about 1000° C. during operation, however a drop in the temperature between 300° C. and 800° C. is required so that they can provide good braking.

Cooling can be provided substantially when the vehicle is moving forward via ventilation of air in the carbon-carbon discs by the intermediary of radial holes pierced on their surface. The pressure of the air is then generated by a scoop placed facing the movement of the aircraft, or by a turbine integrated onto the axis of the wheel.

Likewise, it is known from document U.S. Pat. No. 4,130,187 a system designed to protect and cool the elements of an aircraft wheel.

However, these existing cooling systems have many disadvantages. Indeed, they operate substantially when the vehicle is in displacement since it is the rotation of the wheel that generates the flow of air used for cooling. In addition piercing holes in the carbon-carbon discs weakens them implying maintenance and safety issues.

In addition to these disadvantages, the cooling time for current brakes is long, typically from 30 minutes to 1 hour, thus implying a limitation to the rapid rotation of aircraft.

This invention has for objective to du and even suppress, at least some of these disadvantages.

SUMMARY OF THE INVENTION

According to a first aspect, this invention relates to a system comprising a rotor comprising a body intended to be driven in rotation around a longitudinal direction, with the system also comprising a brake comprising at least one fixed friction element intended to be secured to a stator and at least one movable friction element secured to the rotor and housed inside the body, with the fixed and movable friction elements each having at least one main face and at least one side surface, with a main face of the movable friction element being arranged facing a main face of the fixed friction element, with the brake being configured in such a way that at least when the brake is activated said main faces facing are in contact in such a way as to generate a friction; characterised in that the system comprises at least one cooling device comprising at least:
one first portion forming a conductive ring centred on the longitudinal direction, more preferably arranged between the rotor and the fixed and movable friction elements, arranged facing the side surfaces of the fixed and movable friction elements and configured to capture by irradiation and/or convection the heat generated during the friction by the fixed and movable friction elements, and
one second portion, secured and thermally coupled to the first portion, offset in the longitudinal direction relative to the fixed and movable friction elements in such a way as to not be facing the side surface of the fixed and movable friction elements and configured to dissipate the heat captured by the first portion, by convection and/or irradiation, into the ambient air.

According to another aspect of embodiments of the invention, a system is presented comprising a rotor comprising a body intended to be driven in rotation around a longitudinal direction, with the system also comprising a brake comprising at least one fixed friction element intended to be secured to a stator and at least one movable friction element secured to the rotor and housed inside the body, with the fixed and movable friction elements each having at least one main face and at least one side surface, with a main face of the movable friction element being arranged facing a main face of the fixed friction element, with the brake being configured in such a way that at least when the brake is activated said main faces facing are in contact in such a way as to generate a friction.

The system can further comprise at least one cooling device comprising at least:
one first portion arranged between the body and the fixed and movable friction elements, arranged facing the side surfaces of the fixed and movable friction elements and configured to capture by irradiation and/or convection the heat generated by the fixed and movable friction elements during the friction, and
one second portion, secured and thermally coupled to the first portion, offset according to the longitudinal direction in relation to the body and to the fixed and movable friction elements in such a way as to not be facing the side surface of the fixed and movable friction elements and configured to dissipate the heat captured by the first portion, by convection and/or irradiation, into the ambient air.

As such, the first portion of the cooling device absorbs a portion at least of the heat generated by the friction elements, typically discs.

The first portion as such acts as a heat absorption zone.

The first portion transfers this heat to the second portion, which is not facing the discs. This second portion does not receive any heat from the discs.

The second portion transfers, to the exterior of the system, the heat received from the first portion. This second portion as such acts as energy removal zone.

The invention as such makes it possible to very effectively remove the heat generated during braking.

This invention allows for a much better removal of the heat than pierced Carbon/Carbon discs, advantageously in the phase where the vehicle is stopped.

The cooling is therefore globally faster and the brake can operate in the range of temperature wherein it is effective. The braking is consequently improved.

Particularly advantageously, the cooling device makes it possible to cool the brake even when stopped, i.e. when the rotor is not rotating.

Moreover, as the cooling time of brakes is substantially reduced, this allows for faster resumed use of the vehicles such as aircraft for example after an operating phase of the brake. The rotation frequency of aircraft is therefore improved thanks to the invention.

Furthermore the invention makes it possible to retain solid friction elements, typically solid discs without piercing. The invention therefore offers improved robustness in relation to brakes with pierced discs which is practice are very fragile.

Moreover, this invention is compact. Integrated into a wheel, this system represents only very little material added to the wheel. As such, in a field such as aeronautics or the automobile where the load is a key factor, using this invention is an advantage through its low weight. Its compactness allows it to be installed easily in current systems.

This invention has a certain advantage in terms of its adaptability relatively to various field of application. Indeed, whether in terms of its size and/or the materials used, it is possible to implement this invention in pre-existing brake systems.

Another aspect of this invention relates to a cooling device for a disc brake, the device extending in a longitudinal direction and comprising:
- a first portion configured to surround the discs of the brake, intended for being arranged facing the side surfaces of the brake discs and configured to capture, by irradiation and/or convection, the heat generated by the discs during the friction, and
- a second portion, secured and thermally coupled to the first portion, offset in the longitudinal direction relative to the first portion, provided with fins extending radially relative to the longitudinal direction and configured to dissipate the heat captured by the first portion, by convection and/or irradiation, into the ambient air.

Another aspect of this invention relates to a vehicle axle provided with a system according to this invention.

Another aspect of this invention relates to an aircraft or rolling vehicle provided with a system according to this invention.

Finally, another aspect of this invention relates to a rotating machine comprising rotating shaft coupled to a system according to this invention, with the machine being more preferably taken from: a generator, a retarder, an engine.

BRIEF DESCRIPTION OF THE FIGURES

The purposes and objects as well as the characteristics and advantages of the invention shall appear better in the detailed description of an embodiment of the latter which is illustrated by the following accompanying drawings wherein.

The drawings are provided by way of examples and do not limit the invention. They are block diagrams intended to facilitate the understanding of the invention and are not necessarily to the scale of the practical applications.

DETAILED DESCRIPTION OF THE INVENTION

Before going into the details of the preferred embodiments in particular in reference to the figures, hereinafter various options are mentioned that preferably but not limitingly the invention can have, with these options able to be implemented, either separately, or according to any combination of them:

Advantageously, the cooling device is separate from the body.

Advantageously, the cooling device is secured to the body and added onto the body.

Advantageously, the cooling device is secured to the body.

Advantageously, the cooling device is added onto the body.

Advantageously, the system comprises drive pins of the friction elements.

As such, the cooling device is coupled in rotation with the plurality of discs secured to the rotor.

This makes it possible to increase the pressure of the ambient air on the first portion, as such increasing the thermal exchanges by convection between the discs and the cooling device.

Advantageously, the body has an inner face turned facing the friction elements and at least one friction element secured to the rotor is mechanically connected to said inner face.

Advantageously, the cooling device is secured to the movable disc brakes.

Advantageously, the rotor is facing the stator.

Advantageously, the rotor is located around the stator.

Advantageously, the system comprises at least one drive pin of the friction elements, the at least one pin being secured to the inner face of the body and to the at least one friction element secured to the rotor and wherein the cooling device comprises at least one opening that the pin passes through.

Advantageously and according to an alternative embodiment the at least one friction element secured to the rotor is mechanically connected to a shaft secured to the body.

Advantageously and according to an alternative embodiment the cooling device is secured to the stator.

Advantageously, the system comprises drive pins of the friction elements, with the pins being secured to the shaft and to the at least one friction element secured to the rotor.

Advantageously, the cooling device is secured to the stator.

Advantageously, each friction element has two main faces and at least one side surface, with the friction elements being arranged in such a way that two adjacent friction elements, one secured to the stator and the other secured to the rotor have their main faces facing.

Advantageously, the friction elements are discs.

Advantageously, the brake is a disc brake.

Advantageously, the body has an outer face forming a receiving surface for a tread surface, such as a tyre.

Advantageously, the first portion is longitudinally arranged upright the receiving surface.

Advantageously, the body is a wheel rim.

Advantageously, the first portion has an outer surface coated with a heat screen.

Using a heat screen makes it possible to effectively protect the body and for example a tyre mounted on the body of the thermal irradiation emitted by the first portion that has absorbed heat produced by the discs. This protection of tyres is as such advantageous tore questions of safety and extends the service life of the tyres.

Advantageously, the heat screen is comprised of a material or a combination of materials taken from the following materials: stainless steels, aluminium alloys. Using this material makes it possible to have an effective and resistant heat screen while still retaining suitable protection/weight ratio for the application needs of this invention.

Advantageously, the cooling device is ratably mounted with respect to at least one fixed friction element and wherein the first portion comprises a plurality of blades extending from the first portion and in the direction of the friction elements and increasing the exchange surface by convection and/or irradiation between the friction elements and the first portion of the cooling device.

Using a plurality of blades makes it possible to partially or fully assist the circulation of the ambient air used to cool the friction elements, typically brake discs, during the displacement phases of the vehicle. In addition this allows for a mixing of the ambient air and a better thermal coupling between the brake discs and the cooling device.

The rotation of the cooling device makes, it possible to increase the pressure of the ambient air on blades.

Advantageously, the friction elements are discs and wherein the ratio between the diameter of the discs and the distance separating the plurality of blades from the discs is between 20 and 200, advantageously between 50 and 100 and preferably equal to 80.

This makes it possible to create an ambient air flow between the brake discs, and the blades in order to very effectively cool via convection the brake discs. Moreover, the blades absorb via radiation the heat of the discs.

Advantageously, the first portion and the second portion form two thermally coupled coaxial cylinders.

Advantageously, the first and the second portion form a monolithic part.

Advantageously, the first and the second portion are formed from a single material.

Advantageously and according to an embodiment, the system comprises a heat pipe system configured to remove to the second portion the heat captured by the first portion.

Advantageously, the at least one cooling device comprises at least one material from the following materials: aluminium alloy, stainless steels, titanium, copper, nickel base superalloys.

These materials have thermal conductive properties that are adequate with the mechanical properties required for the application fields of this invention.

Advantageously, the cooling device comprises pyrolytic graphite.

Advantageously, the cooling device comprises pyrolytic graphite encapsulated in a metal material.

This makes it possible to reinforce the robustness of the device.

Advantageously, this invention comprises a heat pipe comprising at least one channel inside of which a heat transfer fluid flows, with the channel extending into the first and second portions of the cooling device, the first portion has at least one proximal portion located on the coupling between the first and the second portions, and a distal portion located at the end of the first portion opposite the proximal portion, with the heat pipe configured in such a way as to allow the heat captured by the first portion to be removed to the second portion.

The distal portion as such acts as a hot zone and the proximal portion as such acts as a cold zone.

The presence of these two zones allows for the formation of a flow of heat and as such to remove the heat.

Using a heat pipe has many advantages such as the range of temperatures that can be adapted to the application needs, simplicity and low cost of production, and great operating reliability.

Advantageously, said heat pipe is a pulsed heat, pipe.

Using a pulsed heat pipe has many advantages such as the range of temperatures that can be adapted to the application needs, simplicity and low cost of production, and great operating reliability.

Using a pulsed heat pipe is particularly advantageous in relation to a conventional heat pipe due to the small diameter of the envelope that provides the pulsed heat pipe with a high compactness on the one hand, and a very high mechanical resistance to resist the high pressures due to the heat pipe fluid.

Advantageously, the cold zones are closer to the second portion than the hot zones.

This makes it possible to remove the heat far from the brake discs.

Advantageously, the heat pipe has several channels radially distributed over the entire surface of the first portion at least.

This makes it possible to go around the cooling device and as such benefit from a maximum of surface in thermal contact with the brake discs.

Advantageously, the heat pipe is secured to the rotor, typically to the wheel when the rotor is secured to a wheel.

Advantageously, the heat pipe is secured to movable friction elements, i.e. movable disc brakes.

Advantageously, the heat pipe is secured to the wheel and to movable disc brakes.

This makes it possible to assist the return of the heat pipe fluid from the cold zone to the hot zone via the centrifuge effect.

Advantageously, the channels are radially distributed over the entire surface of the second portion at least.

Advantageously, the heat pipe is rotably mounted at least with respect to at least one fixed friction element.

Advantageously, the cooling device is secured to the stator, the heat pipe being as such driven in rotation during the rotation of the movable friction elements.

Advantageously, the distal portion is radially farther from the axis of rotation of the rotor than the proximal portion.

As such the hot zones are off-centred to the exterior in relation to the cold zones. This makes it possible to facilitate the return of liquid plugs from the cold zone to the hot zones thanks to the centrifuge forces when the cooling device is in rotation.

Advantageously, the first and second portions of the heat pipe are arranged concentrically.

Advantageously, the hot zones are deployed as a fin towards the exterior in relation to the cold zones in such a way as to assist with the return off the liquid to the ends of the hot zone.

This deployment as a fan of the hot zone corresponds to a tapered shape of the first portion of the cooling device according to its longitudinal direction in such a way as to have a diameter that increases in the direction moving away from the second portion.

This makes it possible to capture a maximum amount of heat generated by the brakes and as such to concentrate this heat to the cold zones in order to then remove it to the second portion.

Advantageously, the pulsed heat pipe comprises at least one capillary or channel of which the length is between 100 and 800 mm, advantageously between 200 and 600 mm, and preferably equal to 350 mm, of which the diameter is between 0.5 mm and 4 mm, advantageously equal to 2 mm.

This makes it possible to have a very large thermal exchange surface between the disc brakes and the pulsed heat pipe in such a way as to increase the removal of the heat.

Advantageously, said at least one capillary or channel comprises bent sections. This makes it possible to have a very large thermal exchange surface between the disc brakes and the pulsed heat pipe in such a way as to increase the removal of the heat. This also makes it possible to increase the number of heat circulation channels in the device.

More preferably the pulsed heat pipe comprises a plurality of capillaries. This makes it possible to have a very large thermal exchange surface between the disc brakes and the pulsed heat pipe in such a way as to increase the removal of the heat. This also makes it possible to increase the number of heat circulation channels in the device.

Advantageously, the heat pipe comprises a plurality of channels and wherein the channels are embedded in the thickness of the first portion.

Advantageously, the heat pipe comprises a plurality of channels and wherein the channels are added onto an inner face of the first and second portions of the cooling device.

Advantageously, the capillaries are arranged on the face of the first portion which is turned facing the discs, alternatively, the capillaries are arranged on the opposite face, advantageously, the capillaries are, embedded in the thickness of the first portion.

This makes it possible to make the pulsed heat pipe much more robust in the event of high pressure inside the latter in relation to a conventional heat pipe having channels with a larger diameter.

Advantageously, the second portion comprises at least one heat sink element taken from: a plurality of fins, a plurality of spikes and any heat conducting element of any geometrical shape, and wherein the thermal conductivity of said heat sink element is greater than 150 W/m·K.

This makes it possible to significantly increase the thermal exchange surface between the cooling device and the ambient air in such a way as to allow for a faster removal of the heat by convection and possibly by irradiation.

Advantageously, the heat sink elements comprise fins formed in at least one material taken from the following materials: aluminium alloy, copper, stainless steels, copper, nickel base superalloys and all type of metals. They can include a core made of pyrolytic graphite encapsulated in a metal so as to increase the thermal conductivity thereof.

More preferably the fins are made from the same material as the second portion.

They are for example welded or brazed on a ring or a tube forming the second portion.

Advantageously, the first portion forms a tube having discontinuities in the form of openings extending according to a direction parallel to the axis of rotation of the rotor. These openings allow for the passage of parts that allow for the mechanical securing of the movable discs and of the rim.

Advantageously, the radial separation of the distal portion with respect to the axis of rotation of the rotor increases along the axis of rotation of the rotor as one moves away from the proximal portion.

This makes it possible to increase the effect of the centrifugal force that more effectively drives the cold heat pipe fluid to the hot portions of the cooling device.

Advantageously, the first portion has a tapered shape forming a non-zero angle with the axis of rotation of the rotor.

This makes it possible to increase the effect of the centrifugal force that more effectively drives the cold heat pipe fluid to the hot portions of the cooling device. Moreover this configuration tends to force the circulation of the fluid to the distal end of the heat pipe.

Advantageously, the second portion is longitudinally offset in relation to the body.

Advantageously, the second portion is longitudinally offset in relation to the fixed and/or movable friction elements.

Advantageously, the second portion is longitudinally offset in relation to the rotor.

Advantageously, the first portion is separate from the support located between the movable discs and the body.

Advantageously, the movable discs and the body form a monolithic part.

Advantageously, the movable discs are fixed on an inner face of the body.

Advantageously, the brake is located facing the body.

Advantageously, the brake is located entirely facing the body according to a longitudinal direction.

Advantageously, the body has an outer face forming a receiving surface configured to receive a movable element that longitudinally covers at least one portion of the body.

Advantageously, the second portion is at east partially longitudinally offset with respect to said receiving surface.

This makes it possible to dissipate the heat more effectively without re-emitting the heat in the direction of the movable element supported by said reception surface.

Advantageously, the movable element is taken from at least: a tread surface, such as a tyre, a belt or a gear wheel.

Advantageously, the ratio between the length of the second portion and the length of the first portion is greater than or equal to 0.2, preferably greater than or equal to 0.5, and advantageously greater than or equal to 1.

The cooling device is facing friction elements.

A general description of the invention shall now be given. Then details for the realisation shall be described in reference to the figures. By default, the term longitudinally or longitudinal direction means the axis of the rotating shaft of the rotor.

This invention relates to a brake cooling system. Advantageously, but not in a limiting manner, this cooling system is intended to be provided on a brake of which the braking is obtained by friction of a friction element secured to a stator with a friction element secured to a rotor. The rotor rotates about an axis extending according to a longitudinal direction.

Typically, the friction elements are discs, for example carbon discs.

This cooling system comprises a first portion placed at the periphery of the brake discs. This first portion is as such placed facing the side surface of the discs.

This first portion is configured to capture the heat released by the discs during braking, but also when the movable discs are not rotating.

This first portion has the general shape of a tube or of a ring, possibly carrying openings such as shall be described in what follows. More preferably the first portion generally has a symmetry of revolution around the axis of the rotor, except possibly openings which shall be described in what follows.

The cooling system also comprises a second portion which is not placed facing the side surface of the discs. This second portion is also not placed facing the face of the discs. This second portion is as such offset at a distance from the discs without receiving or without receiving much of the irradiation of the heat from the discs.

This second portion also has the general shape of a ring. More preferably this second portion also has a symmetry of revolution about the axis of the rotor.

The discs form a space defined by:
two exterior parallel surfaces, typically the main faces of the discs arranged at the ends of the series of discs, and
circular envelope defined by the side surface of the discs and typically forming a cylindrical wall.

As such the plurality of discs comprised within this space. The first portion of the cooling device is arranged facing the circular envelope so as to capture by irradiation and/or convection the heat generated by the discs.

The second portion is arranged outside of the space located outside and facing the circular envelope. Moreover the second portion is located outside of the space located outside and facing the envelope two exterior parallel surfaces. It as such does not receive directly or only very little of the heat generated by the discs.

The first and the second portion are thermally coupled. In particular, the first portion can transfer to the second portion the heat that it has absorbed from the discs by irradiation and/or convection.

The first and the second portion are secured. They more preferably have a continuity of material which improves their thermal exchange by conduction.

Advantageously, the heat is transferred axially from the first portion to the second portion forming an outer zone and/or surface extension zone of the cooling device.

More preferably the unit formed by the first and second portions forms a heat-conducting ring. This ring is as such arranged at the periphery of the discs.

This ring makes it possible to transfer to the ambient air the heat generated by the discs.

So as to allow for a better removal of the heat to the ambient air, this second portion comprises fins, for example radial fins, spikes and more generally any device that makes it possible to develop a substantial thermal exchange surface.

Preferably and very advantageously, the transfer of heat between the first and second portions is carried out at least partially by thermal conduction thanks to a thermally-conductive material.

The materials used in this type of system have a direct impact on the effectiveness of the thermal transfers. As such, according to an embodiment, these are materials referred to as heat superconductors that can be used in this invention. According to a non-limiting example, this can be pyrolytic carbon which comprises layers of graphene linked by covalent bonds. The thermal conductivity of this type of material can reach 1700 W/m·K. The pyrolytic carbon is more preferably encapsulated in composites with a metal base in order to mechanical reinforce this heat superconductor.

According to a particularly advantageous embodiment of this invention, the transfer of heat can be carried out at least partially by the intermediary of a heat pipe.

A heat pipe is a device that makes it possible to transfer heat by evaporation/condensation of a fluid inside an envelope. When the hot portion of the envelope is located at a position that is higher than the cold portion or when the envelope is weightless, structures internal to the envelope can make it possible to bring back the condensates from the cold wall to the hot wall by capillarity for example.

Reference will be made for example to the following documents concerning the heat pipe: Bonjour J., Lefevre F, 2011b, Systèmes diphasiques de contrôle thermique—Thermosiphons et caloducs, Techniques de l'Ingénieur, Vol. BE9545; and Reay D., Kew P., 2006, Heat Pipes—Theory, design and applications, Butterworth-Heinemann.

According to a preferred embodiment, the cooling device of the invention comprises a particular type of heat pipe, called pulsed or oscillating heat pipe. This type of heat pipe is particularly simple and of high performance. A pulsed heat pipe is a system of passive diphasic thermal transfer comprised of at least one capillary tube curved on itself in several "return trips" and bent sections forming as such a network of capillaries. Each one of the ends of the heat pipe is respectively in contact with a cold source and a hot source.

A fluid is introduced therein in the state of saturation with a filling rate between 30 and 80%, advantageously between 40 and 60%, and more preferably equal to 50% of the volume of the tube. In operating speed, oscillations of liquid plugs and bubbles of vapour appear in the system from sufficient thermal flows imposed by the hot source.

As such two types of transfer take place: the transfer of latent heat (evaporation of the liquid) which results in the creation of fluctuations of pressure and as such drives the displacement of the liquid plugs between the evaporation zone and condensation zone, and the transfer of heat transported by the plugs of liquids that will exchange heat between the evaporation zone and the condensation zone.

Such a device has many advantages. Indeed, it has a great simplicity in design implying a low production cost and a high degree of reliability. In addition the mass and the volume that are involved in this system are very low. The operating limits of such a thermal transfer device are potentially very high.

Finally, due to the lack of predictive models for understanding the physics involved in these thermal transfer phenomena, and of the dimensioning, few applications exist for this type of system.

According to a favoured embodiment of this invention, the transfer of heat from the brake discs to the exterior is carried out by thermal conduction through the pulsed heat pipe. Preferably, this pulsed heat pipe is integrated into the thickness of the conduction ring.

Advantageously, the pulsed heat pipe allows for a transfer of heat referred to as by sensitive heat and by latent heat, i.e. by evaporation and by condensation of the heat transfer fluid contained in the pulsed heat pipe.

These embodiments allow for an effective cooling in the dynamic operating phases of the vehicle, i.e. during phases of displacement when the discs are rotating.

This invention has many other technical advantages of which a very great thermal effectiveness, very high lightness and very high compactness.

In this description, the term "ring" means a cylinder or a tube of which the carrier (its transverse profile) is circular and of which the envelope extends according to the direction of its axis of revolution and may or may not have recesses or openings.

This invention shall not be described in detail in relation to FIGS. 1 to 6 which show a non-limiting embodiment of the invention.

Figure 1:
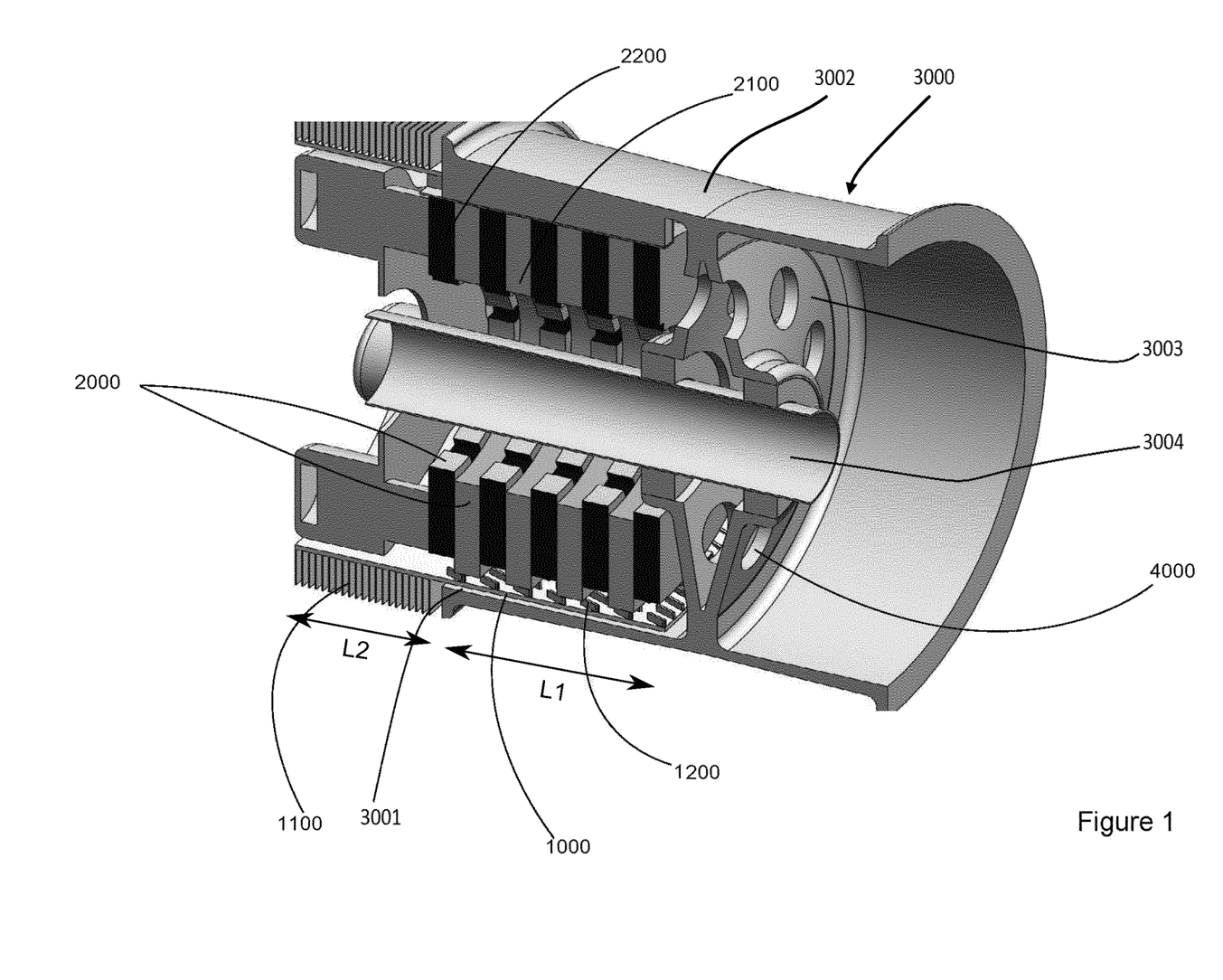
FIG. 1 is a longitudinal cross-section of a system according to an embodiment of the invention, with the system receiving for application, in this non-limiting application a disc brake.

FIG. 1 shows an embodiment of this invention, wherein the cooling device according to the invention is provided on a body 3000 formant a wheel of a vehicle, which can for example be an aircraft.

The wheel comprises a disc brake cooling system according to this invention. Discs 2100 are movable. They are also qualified as fixed friction elements. They are driven in rotation by a rotor about the axis of the rotating shaft 3004 of the rotor, i.e. here by the body 3000 of the wheel forming a rim. Fixed discs 2200, also qualified as movable friction elements, are secured to the stator in relation to typically the frame of the vehicle.

The contact of the fixed discs 2200 with the movable discs 2100, when the wheel is in rotation and in a situation of braking, drives a substantial heating of these discs 2000.

The cooling device forming a conductive ring 1000 then has for function to dissipate this heat, by absorbing it on the first portion 1001 then by transferring it to the second portion 1002 which comprises a surface able to dissipate the heat into the ambient air.

According to a preferred embodiment, the cooling device forms a conducting ring 1000 that is concentric with the axis of the rotating shaft 3004 of the rotor, i.e. of which the axis of revolution is collinear to the axis of the rotating shaft 3004 of the rotor.

According to the embodiment shown, the cooling device 1000 is placed between the discs 2000 and the body 3000 forming here a rim.

More preferably, the first portion 1001 and/or the second portion 1002 forms a conducting ring about the axis of the rotating shaft 3004 of the rotor, i.e. of which the axis of revolution is collinear to the axis off the rotating shaft 3004 of the rotor.

In a clever and preferred manner, the first portion 1001 is located between the rotor and the discs 2000.

Advantageously, an outer zone of the second portion 1002 comprises heat sink elements. These elements are shaped to increase the thermal exchange surface between the second portion 1002 and the ambient air. For example these sink elements are fins 1100 as shown in the FIGS. 1 to 3. Advantageously, the fins 1100 allow for a thermal transfer between the cooling device 1000 and the ambient air by convection and possibly by irradiation.

Optionally but advantageously, the cooling device 1000 forming the conducting ring can include devices able to transfer as effectively as possible the heat generated by the discs 2000. As such, the cooling device 1000 can include, in particular on an inner face of its first portion blades 1200. These blades 1200 are as such turned facing discs 2000, 2100.

Likewise the cooling device 1000 can include a device of the heat pipe type 1300, more preferably a pulsed heat pipe, configured to convey the heat from the first portion 1001 to the second portion 1002.

According to an embodiment, the channels or capillaries of the heat pipe are housed in the thickness of the cooling device, between its outer surface and its inner surface.

Moreover, openings 4000 can be provided in the mechanical structure in order to allow for a circulation of the ambient air to the discs 2100, 2200. This as such allows for a more effective thermal exchange between the brake discs 2000 and the ambient air.

Preferably, the cooling device 1000 is coupled in rotation with the rotor, i.e. with the body 3000 forming a wheel rim in this application example. As such, the cooling device 1000 undergoes a rotating movement at the same time as the wheel. The putting into rotation of the cooling device 1000 makes it possible to assist with the circulation of the ambient air thanks to blades 1200 as such making it possible to increase the transfer of heat by convection between the discs 2000 and the cooling device 1000.

As such, during the movement of the vehicle, for example of the aircraft, the ambient air floods into these openings 4000. The air then comes into contact with the blades 1200 and the cooling device 1000. A thermal exchange by convection is then carried out, the air is heated while the first portion 1001 of the cooling device 1000 drops in temperature, as well as the blades 1200 and the discs 2000. The blades 1200 also absorb the heat of the discs by irradiation. The air continues to flow all along the cooling device 1000 in such a way as to reach the second, portion 1002 of the cooling device 1000 and therefore the thermal exchange surface comprising for example the fins 1100. Moreover, parallel to this thermal transfer by convection, the cooling device 1000 forming a conduction ring is configured to transfer by thermal conduction the heat generated by the discs 2000 from the first portion 1001 to the second 1002.

The fins 1100 then form a zone that has a very large exchange surface in order to improve the thermal exchange by convection between the colder air and the hotter fins 1100 even by irradiation with other surrounding elements.

When the body 3000 forming a wheel rotates the blades 1200 make it possible to assist the circulation of the ambient air in the space separating the discs 2000 and the cooling device 1000, a space called discs 2000/conducting ring 1000 interstice. The air is then in forced convection between the first portion 1001 of the cooling device 1000 and the discs 2000. This makes it possible on the one hand to remove the heat from the discs 2000 to the exterior, and on the other hand to effectively transfer by convective and irradiation mixing the heat of the discs 2000 to the cooling device 1000.

According to a particular embodiment not shown, the cooling device 1000 can be coupled to a device for setting the ambient air into motion such as, for example, turbine or fan blades placed upstream on the axis of rotation of the wheel.

When the wheel is stopped, the residual heat of the discs 2000 is transferred mainly by conduction of the air located in the discs 2000/conducting ring 1000 interstice and by irradiation. The cooling device 1000 transfers the heat of the discs by conduction from the first portion 1001 to the finned zone of the second portion 1002 where it is removed to the ambient air, the fins 1100 making it possible to increase the thermal exchange surface to the ambient air.

This removal of the calories to the ambient is carried out by forced convection and by irradiation during the movement of the vehicle, or by natural convection and irradiation when the vehicle is stopped.

Advantageously, the first portion 1001 of the cooling device 1000 comprises a heat screen 1500 on its face which is not facing the discs 2000, 2001, i.e. on its outer surface in the example shown. This heat screen 1500 is shaped to minimise the heat transfers from the cooling device 1000 to the body 3000 of the rotor, typically to the wheel.

According to an embodiment, the body 3000 has an outer face forming a receiving surface 3002 configured to receive a movable element. This element mobile can for example be a tread surface such as a tyre, a belt or a gear wheel. Preferentially, this movable element longitudinally covers at least one portion of the body 3000.

In the case where the body 3000 has such a reception surface 3002, this heat screen 1500 then has for advantage to protect this movable element from excessive heating. Preferably and in a not limiting manner, this screen is carried out using several thin sheets of stainless steel.

As shown in FIG. 1, and in a not limiting manner, all of the second portion 1002 is longitudinally offset from the reception surface 3002. This then allows for a removal of the heat to the ambient, not to the movable element. According to this configuration, which is solely a non-limiting example of implementing this invention, the movable element, for example a tyre, therefore does not receive the heat dissipated by the second portion 1002. This then ensures an improvement in the service life of this movable element.

Figure 2:
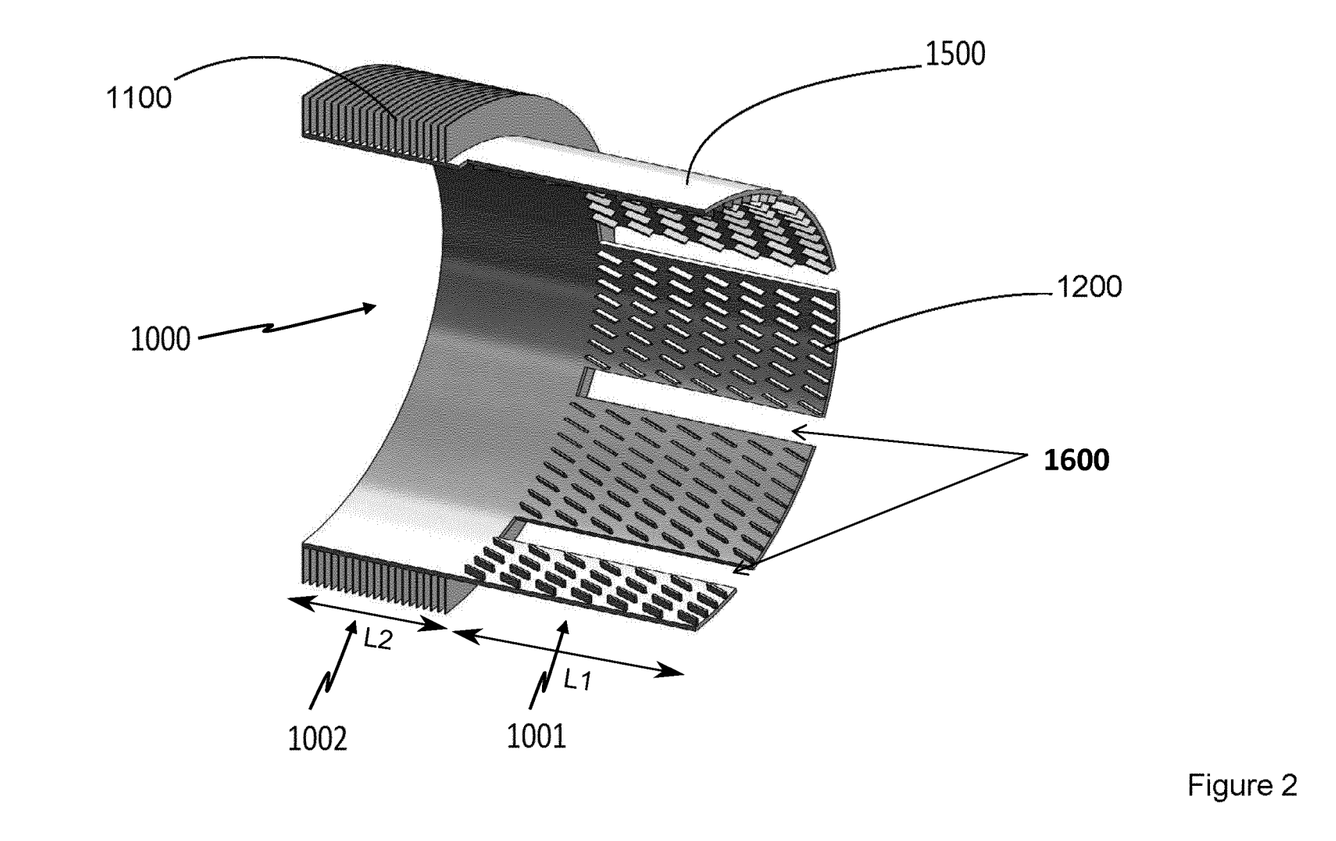
FIG. 2 is a perspective view of the cooling device provided on the system shown in FIG. 1.

FIG. 2 shows the cooling device 1000 withdrawn from the system comprising the brake. In this embodiment, the cooling device 1000 comprises fins 1100 and blades 1200.

The first portion 1001 comprises the blades 1200. The first portion 1001 has openings 1600 for the passage of drive elements of the movable discs 2100, with these drive elements being for example pins secured to an inner face 3001 of the body 3000. These openings 1600 extend mainly according to the longitudinal direction.

The second portion 1002 comprises a continuous zone that comprises the fins 1100.

The conducting ring 1000 is fixed with the heat screen to the rim in a removable manner thanks to bolts in order to be driven in rotation with the latter.

According to an alternative embodiment, the cooling device 1000 can be carried out using at least one of the following materials: aluminium alloys, stainless steels, titanium in encapsulation of pyrolytic graphite.

Very advantageously, using pyrolytic graphite makes it possible to increase the thermal conductivity according to the main axis of the cooling device 1000. For example, an encapsulated pyrolytic graphite makes it possible to obtain a thermal conductivity of 800 W/m·K according to the main axis, i.e. the axial axis, of the cooling device 1000, making it possible as such to significantly increase the removal of the heat during the static phase, the parking phase for an aircraft for example.

The encapsulation of the pyrolytic graphite advantageously makes it possible to reinforce the robustness of the cooling device.

Alternatively, the pyrolytic graphite is not encapsulated.

Using pyrolytic graphite in this configuration makes it possible as simple example and non-limiting way to gain a factor between 1.2 and 5, advantageously between 2 and 4, and more preferably equal to 3 in the cooling time below the limit temperature on the full landing, rolling and parking cycle.

The pyrolytic carbon is at least arranged on the first portion 1001 of the cooling device 1000. Advantageously it is also arranged on the second portion 1002 of the cooling device 1000.

This embodiment with encapsulated and arranged pyrolytic carbon makes it possible to improve the transfer of heat by simple thermal conduction between the first 1001 and second 1002 portions.

In this embodiment the cooling device 1000 is preferably made from pyrolytic graphite encapsulated in aluminium. This makes it possible to limit the weight of the cooling device 1000.

Figure 3:
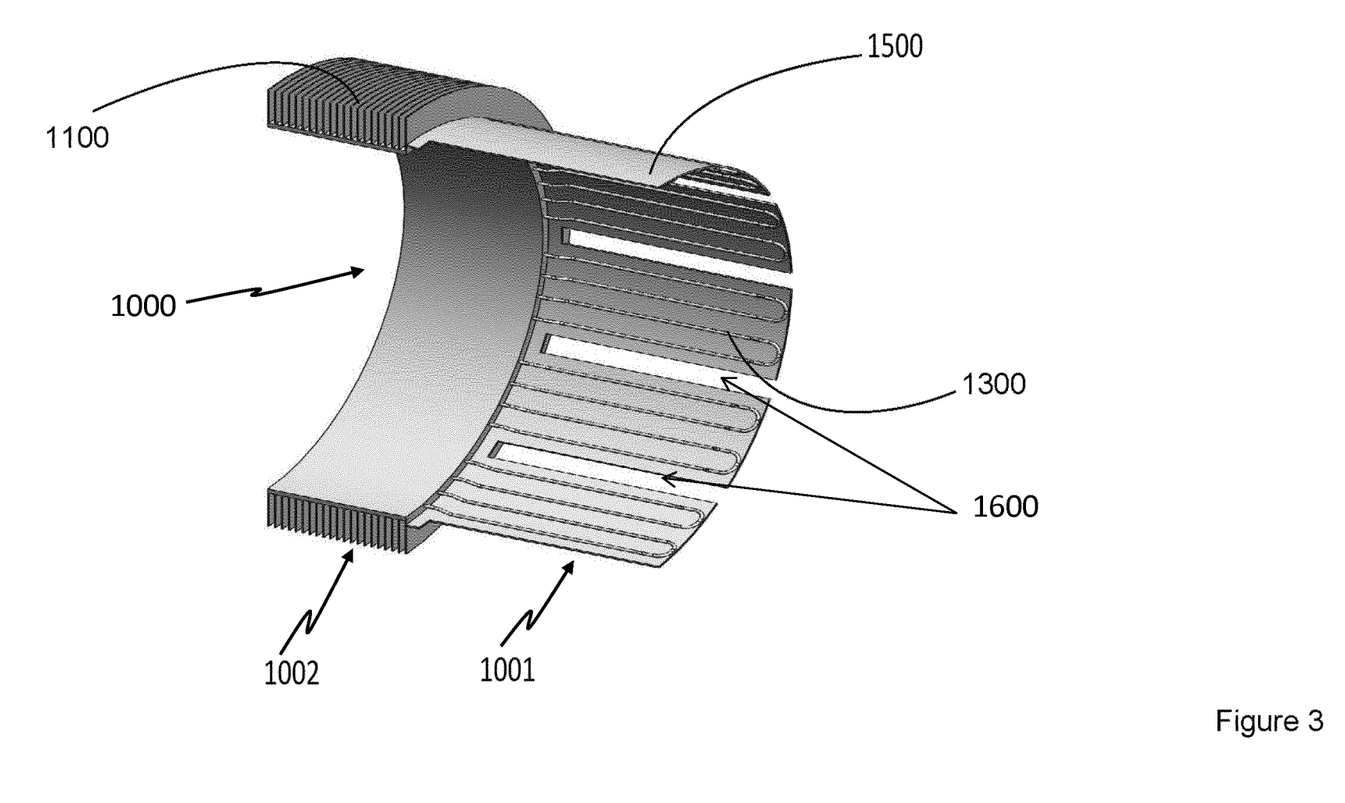
FIG. 3 shows another example of a cooling device according to this invention and comprising a heat pipe.

According to an embodiment shown in FIG. 3, the cooling device 1000 can include a heat pipe 1300, more preferably a pulsed heat pipe configured to transfer the heat from the first portion 1001 of the conduction ring to the second portion 1002. The arrangement of the branches of the pulsed heat pipe 1300 is more preferably concentric to the conduction ring.

The first portion 1001 has a proximal portion forming the junction between the first 1001 and second 1002 portions, and a distal portion located at one end of the channel opposite the proximal portion. The hot zone 1320 of the heat pipe 1300 is located on the distal portion, while the cold zone 1310 of the heat pipe is located on the proximal portion.

As such a portion of the channels or capillaries of the heat pipe 1300 is located in the first portion 1001 of the cooling device 1000 in order to capture the heat of the discs. This portion of the channels forms the hot zone 1320 of the heat pipe. Another portion of the channels of the heat pipe 1300 is shared between the first portion 1001 and the second portion 1002 of the cooling device 1000 in order to cool the fluid of the channels. This portion of the channels forms the cold zone 1310 of the heat pipe.

More preferably, the channels of the heat pipe are embedded in the thickness of the cooling device 1000. According to another embodiment, they are arranged on the face of the first portion which is placed facing the discs, i.e. the inner face in the example shown. Advantageously, the outer face of the heat pipe is covered by the heat screen 1500.

As introduced hereinabove, heat pipes operate with a fluid. The fluids that can be used as a heat pipe fluid are well known to those skilled in the art, and depend on the operating temperature range.

To create a pulsed heat pipe, the fluids that can be considered are toluene from 70° C. to 280° C., naphtalene from 150° C. to 400° C., water from 50° C. to 300° C. and sodium from 550° C. to 1100° C.

In this invention, water was h as the heat pipe fluid. This fluid offers the following advantages:

The temperature range that can be used is adapted to the use of this invention in the field of vehicles and aircraft, for example.

Water does not have any problem in terms of toxicity or flammability in the event of a leak.

In case of accidental overheating, the pressure can rise to a high value by following the pressure curve of saturating steam (critical pressure of 220 bars for a temperature of 374° C.). However, the small diameter of the channels of a pulsed heat pipe make the latter much more robust than a conventional heat pipe of a larger diameter.

In case of accidental overheating even up to 1000° C., was does not become dissociated contrary to organic fluids which decompose starting at 300° C. to 400° C. This decomposition then generates incondensable gasses that hinder the correct operation of the heat pipes after overheating.

According to an embodiment, the envelope materials of the heat pipe 1300, therefore the materials forming the first portion 1001 at least of the cooling device 1000 are one from:

For water: copper, stainless steel (with treatment making it possible to limit the production of incondensable gas (hydrogen) hindering the operation of the pulsed heat pipe).

For Toluene and Naphtalene: stainless steels.

For liquid metals: stainless steels, nickel base superalloys.

Note that these same materials can be used for a cooling device 1000 that does not comprise any heat pipe.

Figure 4:
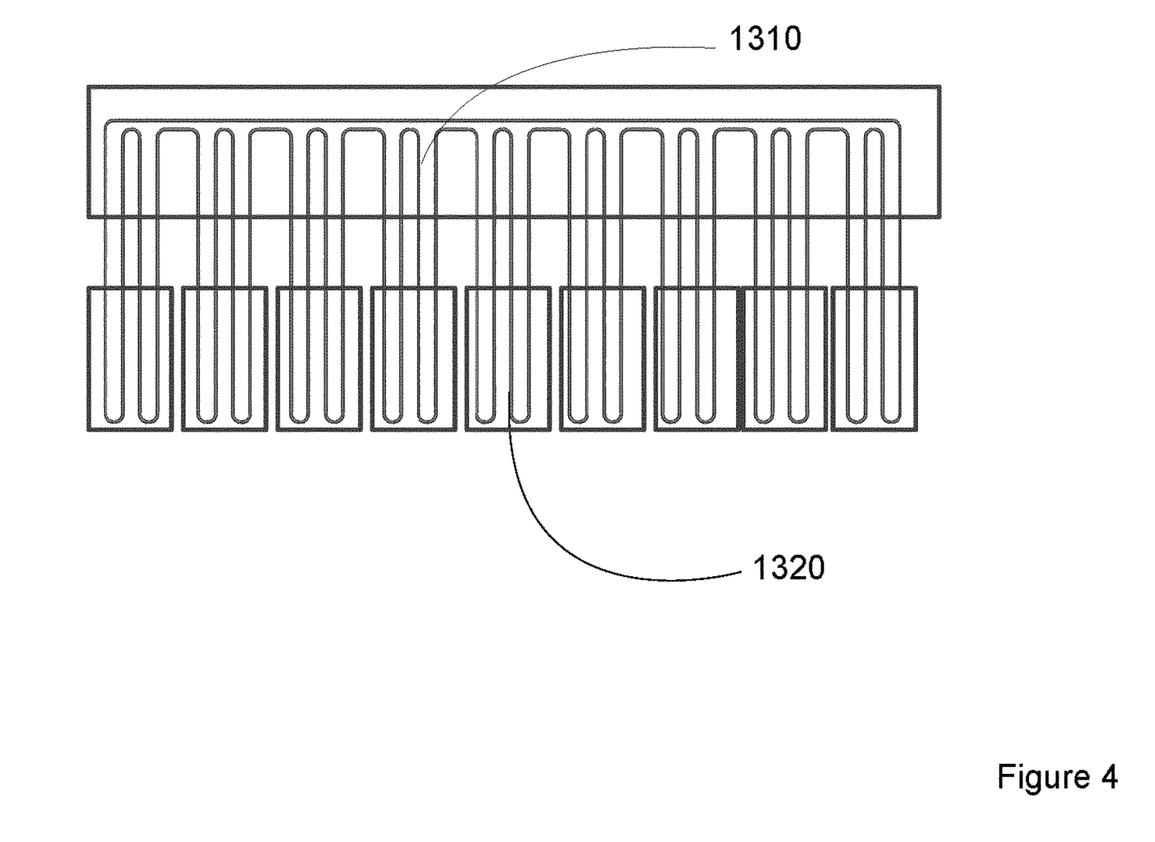
FIG. 4 shows the circuit of a pulsed heat pipe provided on the cooling device illustrated in FIG. 3. In this view, the cooling device is shown flat.

FIG. 4 shows an unfolded view of an embodiment of a pulsed heat pipe 1300. In this figure the cold zones 1310, i.e. the proximal portion of the heat pipe 1300, and hot 1320, i.e. the distal portion of the heat pipe 1300, are shown.

Figure 5:
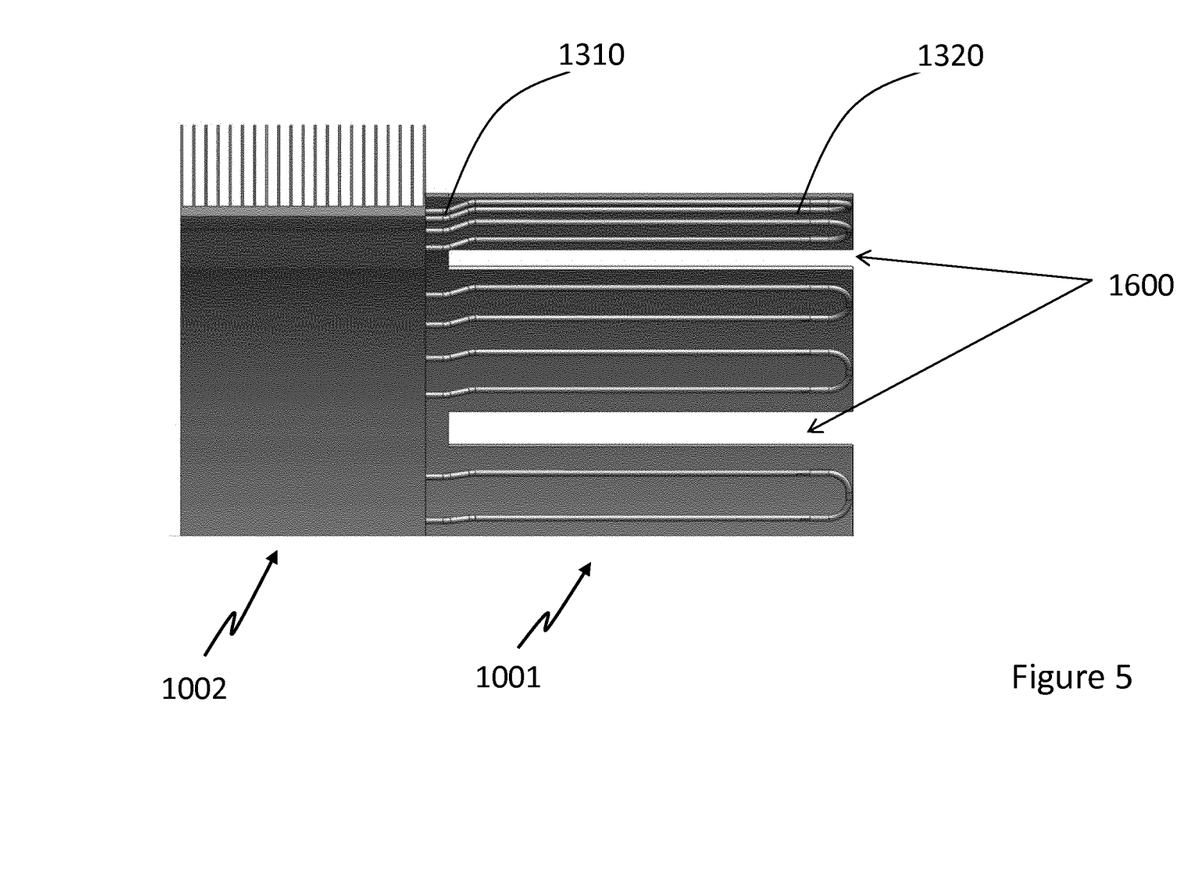
FIG. 5 shows a view of half of a cooling device comprising a pulsed heat pipe with the hot zones off-centred to the outside and concentric to the cold zone.

As shown in FIG. 5 the hot zones 1320 can be slightly off-centred towards the exterior of the cooling device 1000. As such, the hot ends of the channels are farther away from the axis of rotation than the cold zones 1310 which are arranged in the second portion 1002 of the cooling device 1000.

This makes it possible to facilitate the return of liquid plugs from the cold zone 1310 to the hot zones thanks to the centrifugal forces when the cooling device 1000 is in rotation (in the landing phase or taxi phase for the case of an aircraft for example).

Figure 6:
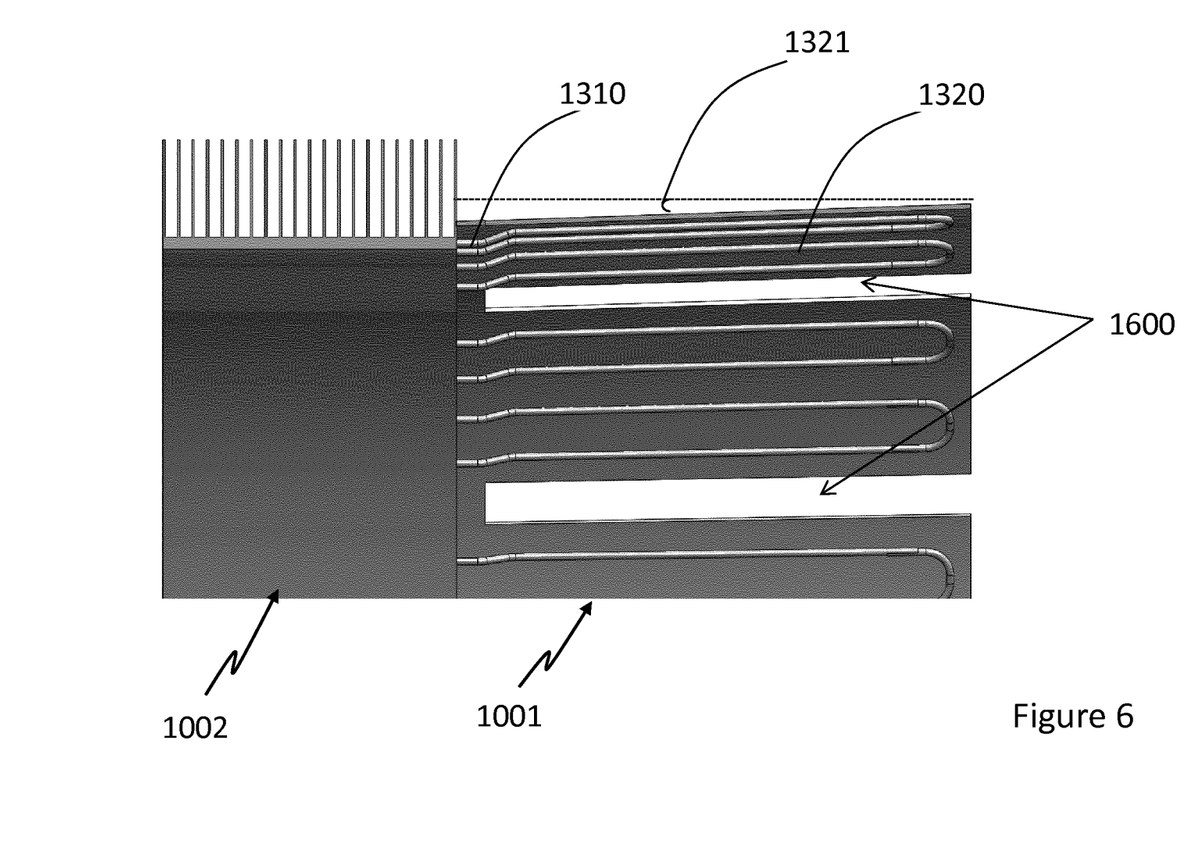
FIG. 6 shows a view of half of a cooling device comprising a pulsed heat pipe with the hot zones off-centred and deployed as a fan.

As shown in FIG. 6, and according to an embodiment, the hot zones 1320 can be slightly off-centred towards the exterior of the cooling device 1000 and deployed as a fan and/or as a cone. As such the distal portion of the heat pipe 1300 is farther away from the axis of rotation of the rotor than the proximal portion. The angle 1321 shows indeed this deployment in tapered shape that thus has, according to this embodiment, the first portion 1001 of the cooling device 1000. This angle 1321 is advantageously and according to an embodiment between and 60°, more preferably between 1° and 45 and more preferably between 1 and 10°, and more preferably between 3 and 10°.

This angle 1321 is measured for example between the axis of rotation of the rotor and the envelope wherein the heat pipe is comprised, in this example the tapered envelope.

As such, the hot ends of the hot zones 1320 of the channels are farther away from the axis of rotation than the cold zones 1310 which are arranged partially in the second portion 1002 of the cooling device 1000.

This makes it possible to facilitate the return of liquid plugs from the cold zone 1310 to the hot zones 1320 thanks to the centrifugal forces when the cooling device 1000 is in rotation (in the landing phase or taxi phase for the case of an aircraft for example).

In this configuration, the thermal effectiveness of this invention can be improved by the geometrical aspect of the disposition of the hot zones 1320 in such a way as to allow for a better circulation of the cold eat pipe fluid to said hot zones 1320, mainly to the end of the distal portion. Indeed, the centrifugal force, due to this particular geometry as a fan and/or as a cone, forces the fluid to be moved to this distal portion.

Using a heat pipe confers in particular the following advantages:

A highly reduced thermal resistance.

A highly reduced ring mass.

A less expensive manufacturing cost in the case of mass production.

Details of a non-limiting example of the invention shall now be described.

The cooling device 1000 forming the conduction ring has a length according to the longitudinal direction between 100 and 600 mm, advantageously between 250 and 450 mm and preferably equal to 350 mm.

The length L1 of the first portion 1001 according to the main axis of the cooling device 1000 is between 50 and 400 mm, advantageously between 150 and 300 mm and preferably equal to 225 mm, and this first portion has a diameter between 100 and 800 mm, advantageously between 300 and 600 and more preferably equal to 440 mm. The length L2 of the second portion 1002 according to the main axis of the coding device 1000 is between 50 and 200 mm, advantageously between 100 and 150 mm and preferably equal to 125 mm, and this second portion 1002 has a diameter between 80 and 800 mm, advantageously between 350 and 500 mm and more preferably equal to 430 mm.

According to an embodiment, the fins 1100 can be, for example, fins made of an aluminium alloy having a thickness between 0.1 mm and 10 mm, advantageously between 0.5 mm and 5 mm and preferably equal to 1 mm. The height of each fin is between 5 mm and 100 mm, advantageously between 10 mm and 50 mm and preferably equal to 25 mm.

By way of example, the thermal conductivity of the fins can be between 100 and 800 W/m·K, advantageously between 200 and 600 W/m·K, and mare preferably entre 150 W/m·K and 220 W/m·K.

The fins can have at least one geometrical shape from: square, trapezoidal or any shape that makes it possible to minimise their mass in relation to the effectiveness of the thermal exchanges required.

The blades are not in contact with the discs 2000. The distance that separates the blades 1300 from the discs 2000 is between 2 and 20 mm, advantageously between 5 and 15 mm and preferably equal to 10 mm.

The invention is not limited to the embodiments described hereinabove and extends to all the embodiments covered by the claims.

The invention claimed is:

1. A system comprising:
   a rotor comprising a body configured to be driven in rotation around a longitudinal direction; and
   a brake comprising at least one fixed friction element configured to be secured to a stator and at least one movable friction element secured to the rotor and housed inside the body, the fixed and movable friction elements each having at least one main face and at least one side surface, with a main face of the at least one movable friction element being arranged facing a main face of the at least one fixed friction element, with the brake being configured in such a way that, at least when the brake is activated, said main faces of the at least one movable friction element and the at least one fixed friction element are in contact in such a way as to generate a friction;
   wherein the system comprises at least one cooling device including
      one first portion forming a conductive ring centered on the longitudinal direction, arranged between the rotor and the fixed and movable friction elements, arranged facing the side surfaces of the fixed and movable friction elements and configured to capture by irradiation and/or convection heat generated during the friction by the fixed and movable friction elements, and one second portion, secured and thermally coupled to the first portion, offset in the longitudinal direction relative to the fixed and movable friction elements in such a way as to not be facing the side surfaces of the fixed and movable friction elements and configured to dissipate the heat captured by the first portion, by convection and/or irradiation, into ambient air; and wherein the system further comprises a heat pipe including at least one channel in which a heat transfer fluid flows, the at least one channel extending into the first portion and the second portion.

2. The system according to claim 1, wherein the cooling device is secured to the body.

3. The system according to claim 2, wherein the body has an inner face turned facing the fixed and movable friction elements and the at least one movable friction element secured to the rotor is mechanically connected to said inner face.

4. The system according to claim 3, wherein the system comprises at least one drive pin, the at least one drive pin being secured to the inner face of the body and to the at least one movable friction element secured to the rotor and wherein the cooling device comprises at least one opening that the at least one drive pin passes through.

5. The system according to claim 1, wherein
the body has an outer face forming a receiving surface configured to receive a movable element that longitudinally covers at least one portion of the body.

6. The system according to claim 5, wherein the first portion is longitudinally arranged to coincide with the receiving surface.

7. The system according to claim 5, wherein the second portion is at least partially longitudinally offset with respect to said receiving surface.

8. The system according to claim 5, wherein the movable element is at least one of a tire, a belt, and a gear wheel.

9. The system according to claim 1, wherein a ratio between a length L2 of the second portion and a length L1 of the first portion is greater than or equal to 1.

10. The system according to claim 1, wherein the body is a wheel rim.

11. The system according to claim 1, wherein the first portion has an outer surface coated with a heat screen.

12. The system according to claim 11, wherein the heat screen is composed of a material or a combination of materials selected from among stainless steels and aluminum alloys.

13. The system according to claim 1, wherein the first portion and the second portion form two thermally coupled coaxial cylinders.

14. The system according to claim 1, wherein the first and the second portions form a monolithic part.

15. The system according to claim 14, wherein the first portion and the second portion are formed from a single material.

16. The system according to claim 1, wherein the at least one cooling device comprises at least one material from among aluminium alloy, stainless steels, titanium, copper, and nickel base superalloys.

17. The system according to claim 1, wherein the cooling device comprises pyrolytic graphite.

18. The system according to claim 17, wherein the cooling device comprises pyrolytic graphite encapsulated in a metal material.

19. The system according to claim 1, wherein the first portion has at least one proximal portion located on a coupling between the first and the second portions, with the first portion also having at least one distal portion located at an end of the first portion opposite the proximal portion, with the heat pipe configured in such a way as to allow the heat captured by the first portion to be removed to the second portion.

20. The system according to claim 19, wherein said heat pipe is a pulsed heat pipe.

21. The system according to claim 19, wherein the heat pipe has a plurality of channels radially distributed over at least an entire surface of the first portion.

22. The system according to claim 21, wherein the channels are radially distributed over an entire surface of the second portion.

23. The system according to claim 21, wherein the plurality of channels are embedded in a thickness of the first portion.

24. The system according to claim 19, wherein the heat pipe is rotably mounted with respect to the at least one fixed friction element.

25. The system according to claim 24, wherein the cooling device is secured to the rotor, the heat pipe being driven in rotation during rotation of the at least one movable friction element.

26. The system according to claim 24, wherein the distal portion is radially farther from an axis of rotation of the rotor than the proximal portion.

27. The system according to claim 26, wherein a radial separation of the distal portion with respect to the axis of rotation of the rotor increases along the axis of rotation of the rotor with increased distance away from the proximal portion.

28. The system according to claim 19, wherein the heat pipe comprises a plurality of channels and wherein the channels are positioned on an inner face of the first and second portions of the cooling device.

29. The system according to claim 1, wherein the first portion has a tapered shape forming a non-zero angle with an axis of rotation of the rotor.

30. The system according to claim 1, wherein the second portion comprises at least one heat sink element selected among a plurality of fins and a plurality of spikes, and wherein a thermal conductivity of said at least one heat sink element is greater than 100 W/m·K.

31. The system according to claim 30, wherein the at least one heat sink element comprises fins formed from at least one material among aluminium alloy, stainless steels, copper, and superalloys.

32. The system according to claim 1, wherein the cooling device is facing the fixed and movable friction elements.

33. A vehicle axle provided with the system according to claim 1.

34. An aircraft or rolling vehicle provided with the system according to claim 1.

35. A rotating machine comprising a rotating shaft coupled to the system according to claim 1.

36. A cooling device for a disc brake comprising fixed and movable friction elements, the cooling device extending in a longitudinal direction and comprising:
a first portion forming a conductive ring centered on the longitudinal direction, configured to surround discs of the brake, configured to be arranged facing side surfaces of the brake discs and configured to capture, by irradiation and/or convection, heat generated by the discs during friction generated by the discs;

a second portion, secured and thermally coupled to the first portion, offset in the longitudinal direction relative to the first portion and to the fixed and movable friction elements, configured to dissipate the heat captured by the first portion, by convection and/or irradiation, into ambient air; and wherein the cooling device further comprises a heat pipe including at least one channel in which heat transfer fluid flows, the at least one channel extending into the first portion and the second portion.

37. The cooling device according to claim 36, wherein the second portion is provided with fins extending radially relative to the longitudinal direction.

\* \* \* \* \*